3,817,933
PROCESS FOR THE PREPARATION OF HIGH MOLECULAR WEIGHT HYDROXYPOLYURETHANES WHICH ARE SOLUBLE IN ORGANIC SOLVENTS
Georg Niederdellmann, Heinrich Bormann, and Horst Conrad, Dormagen, and Günter Oertel, Cologne, Germany, assignors to Bayer Aktiengesellschaft, Leverkusen, Germany
No Drawing. Filed Sept. 28, 1972, Ser. No. 293,186
Claims priority, application Germany, Oct. 6, 1971, P 21 49 836.2
Int. Cl. C08g 22/04, 53/02
U.S. Cl. 260—75 NE      11 Claims

ABSTRACT OF THE DISCLOSURE

A three-stage process for the preparation of high molecular weight polyurethanes which are soluble in organic solvents and which contain free hydroxyl groups is disclosed wherein a dihydroxy compound and a diisocyanate are reacted at a temperature of 110° C. to 160° C. in the presence of a non-polar or slightly polar solvent in a first stage and then reacted at a reduced temperature of 60° C. to 100° C. for 12 to 72 hours in a second stage and then the solvent is removed in a third stage at a temperature above 100° C.

---

High molecular weight hydroxypolyurethanes which are soluble in organic solvents have been commercially important for a long time, especially for the production of two-component coating compositions and adhesives (see Handbuch "Bayer-Kunststoffe," 3rd edition, 1963, page 132 et seq. and page 422 et seq.).

The preparation of these hydroxy polyurethanes has been described, for example, in German Patent Specifications Nos. 962,552 and 1,012,456. These compounds are prepared by adding a diisocyanate, e.g. tolylene diisocyanate, p-phenylene-diisocyanate, diphenylmethane-4,4'-diisocyanate or hexamethylenediisocyanate, etc. to linear compounds which contain two hydroxyl groups and have a molecular weight below 5000, e.g. polyesters of succinic acid, adipic acid, sebacic acid, dodecane dicarboxylic acid, phthalic acid, etc. and ethylene glycol, polyethylene glycols, propylene glycol, polypropylene glycols, butanediol, hexanediol, neopentylglycol, etc. or polyethers, e.g. those based on ethylene oxide, propylene oxide and butylene oxide, at 80 to 90° C. in such proportions that the NCO/OH ratio is less than or equal to 1, preferably 0.92 to 0.99, stirring the reaction mixture briefly to homogenize it and then reheating it in a container at 120° C. for 10 hours to complete the reaction. The resulting products are high molecular weight, rubber-like substances which have average molecular weights varying between 30,000 and 250,000 according to the NCO/OH ratio, preferably between 50,000 and 150,000.

It has long been known, e.g. from German Patent Specification No. 962,552, that the reaction of isocyanates with compounds containing active hydrogen atoms carried out in the melt, as described above, proceeds very unevenly and is very difficult to control and not readily reproducible (see Otto Bayer: "Das Diisocyanat-Polyadditionsverfahren" in Kunststoff-Handbuch, volume VII, page 20, published by Richard Vieweg and August Hochtlen, of Carl Hauser-Verlag, Munich, 1966, and Houben-Weyl, volume 14, part 2, pages 72 to 73). The literature cited above recommends the use of inert, organic solvents, especially hydrocarbons such as benzene, toluene, xylene, chlorobenzene and o-dichlorobenzene, to ensure a smooth polyurethane reaction. The reaction of butane-1,4-diol with hexamethylene diisocyanate in chlorobenzene to produce a polyurethane powder which has an average molecular weight of up to 15,000 and a melting point of 184° C. and can be processed by injection molding is given as an example.

There have been several attempts to apply this method to the reaction of diisocyanates with high molecular weight polyols such as polyesters and polyethers but so far there has been no success in obtaining even approximately the same molecular weights as by the melt process. Thus, for example, according to U.S. Pat. No. 3,223,672 the reaction of equi-molar quantities of a linear aliphatic polyester which contains hydroxyl groups (molecular weights 1500 to 3000) with an aromatic diisocyanate in boiling aromatic solvents such as benzene, toluene or xylene yields polyurethanes which have an average molecular weight of 10,000 to 15,000 corresponding to a solution viscosity of 400 to 3000 centipoises at room temperature, for solutions which are adjusted to a concentration of 10 to 30% by weight with a polar solvent, preferably methyl ethyl ketone. These solutions are recommended for use as bonds for laminates but, owing to their low molecular weight and low solution viscosity, are not suitable for high quality textile coatings.

German Auslegeschrift No. 1,301,124 describes the preparation of polyurethanes by the reaction of (a) 1 mol of polyester (molecular weight 1200–5000) which has terminal hydroxyl groups, (b) 2 to 4 moles of a diol which contains primary hydroxyl groups and an optional component (c) up to 0.5 mol of a triol containing primary and/or secondary hydroxyl groups with aliphatic diisocyanates at NCO/OH ratio=1, using chlornated aromatic solvents which are inert towards isocyanate groups and have a boiling point of between 120 and 200° C., e.g. chlorobenzene or o-dichlorobenzene. The polyurethanes obtained, however, are insoluble in most organic solvents such as methylene chloride, chloroform, trichloroethylene, cyclohexane, benzene, tolene, acetone, methyl ethyl ketone, ether, dioxane, tetrahydrofuran, pyridine, dimethylformamide and dimethylsulphoxide and after removal of the chlorinated aromatic solvent they can only be processed thermoplastically.

According to the present state of the art, a reproducible synthesis of linear polyurethanes with molecular weights above 100,000 in solution can only be achieved by reaction prepolymers which contain isocyanate groups with highly reactive chain lengthening agents, e.g. diamines or dihydrazines. Polymers of this type, which have been widely described in the literature, have, however, completely different properties owing to the urea configuration built into their structure. In particular their solubility is in most cases restricted to highly polar, expensive solvents such as dimethylformamide or dimethylsulphoxide.

It has now surprisingly been found that hydroxypolyurethanes which have very high molecular weights (average molecular weights up to and above 250,000) and are soluble in most organic solvents can be obtained in a smooth reaction, even in the presence of solvents, by reacting linear dihydroxy compounds with diisocyanates at an NCO/OH ratio of less than or equal to 1, preferably 0.95 to 1.0, without the addition of chain lengthening agents, if a three-stage process is employed in which (a) polyurethane formation is carried out in a solvent which is non-polar, at a high reaction temperature which is more favorable for polyurethane formation than for unwanted side reactions, (b) the reaction mixture is cooled before thermal degradation sets in and is stabilized by reheating at a relatively low temperature until it is free from isocyanate groups and (c) the solid polyurethane product is then obtained by removing the slightly polar solvent used as the reaction medium.

This invention therefore relates to a three-stage process for the preparation of high molecular weight polyurethanes which still contain free hydroxyl groups and which are soluble in organic solvents from dihydroxy compounds, preferably from hydroxyl polyesters having an average molecular weight of 500 to 5000, and organic diisocyanates at an NCO/OH ratio of less than or equal to 1, wherein in a first reaction stage (a) the starting components, preferably without catalysts, are reacted at a specific reaction temperature of between 100° C. and 160° C., preferably between 115° C. and 140° C., in the presence of 30 to 80 parts by weight, preferably 50 to 60 parts by weight, of a non polar or slightly polar solvent such that the sum of the quantity of solvent used and the quantity of starting components is 100 parts by weight, the viscosity of the reaction mixture being constantly controlled and the reaction being continued until the viscosity reaches a maximum, (b) the reaction mixture is then heated in a second reaction stage at 60 to 100° C., preferably 70 to 90° C., for 12 to 72 hours until no more free isocyanate can be detected and (c) the solvent is removed in a third reaction stage at reduced pressure and elevated temperature in known manner.

The dihydroxy compounds used may be known compounds having a molecular weight of 500 to 5000, e.g. the usual linear polyesters, polyethers or polyacetones which have two free hydroxyl groups. Polyesters having an average molecular weight of 500 to 5000 and particularly those which have an average molecular weight of 800 to 2500 are preferred e.g. polyesters of succinic acid, adipic acid, sebacic acid, dodecanecarboxylic acid or o-, m- or p-phthalic acid and ethylene glycol, polyethylene glycols (e.g. molecular weight 2000), propylene glycol, polypropylene glycols (e.g. molecular weight 3000), butane-1,4-diol, hexane-1,6-diol or neopentyl glycol or, if desired, mixtures of such polyesters with low molecular weight diols such as ethylene glycol, butane-1,6-diol or hexane-1,6-diol. Other suitable dihydroxy compounds have been described, for example, in Kunststoff-Handbuch, volume VII. Polyurethane by Vieweg and Hochtlen, Carl-Hauser-Verlag, 1966, pages 45–74.

The organic diisocyanates used may be any aliphatic, cycloaliphatic, araliphatic or aromatic diisocyanates, e.g. tolylene diisocyanate, p-phenylenediisocyanate, diphenyl methane-4,4'-diisocyanate, hexamethylenediisocyanate, 3-isocyanatomethyl-3,5,5-trimethylcyclohexylisocyanate or linear adducts containing two isocyanate groups obtained from the above organic diisocyanates with organic compounds containing two reactive hydrogen atoms such as those described above. The diisocyanates described e.g. in Justus Liebigs Annalen der Chemie, 562, pages 75 to 136 (1949) may also be used.

Suitable solvents are non-polar or slightly polar solvents such as for example toluene, xylene, cyclohexane, benzene, diisopropylether, di-n-butylether, carbon disulphide, carbon tetrachloride, n-hexane or solvents of similar polarity. The preferred solvent is toluene. The reaction is carried out using 30 to 80 parts by weight, preferably 50 to 60 parts by weight of solvent per 70 to 20 parts by weight, preferably 50 to 40 parts by weight of starting components. The solvents must be able to dissolve the starting components readily and dissolve the resulting polyaddition product at least to such an extent that a homogeneous phase is maintained under the reaction conditions.

The reaction is carried out at two temperature stages known as the "chain building phase" (a) and the "stabilizing phase" (b). In the "chain building phase" (a) predominantly linear polyurethane chains are built up at a specific reaction temperature of between 100 and 160° C. (operating pressure when using toluene up to 2.5 excess atmospheres), preferably 115 and 140° C., by the polyaddition of dihydroxy compound and diisocyanate. The specific reaction temperature is one which must be determined by a separate test for each combination of diol and diisocyanate. The specific reaction temperature is that temperature which, at a given NCO/OR ratio, the highest viscosity, corresponding to the highest molecular weight, is obtained with the lowest proportion of allophanate branching (Examples 9 and 10). Since specific reaction temperatures are in most cases above the boiling point of the solvent used, the reactions are carried out in reactors suitably designed for the required excess pressure. It is not necessary in principle to use catalysts for the process claimed here, and this provides special advantages for the stability and subsequent processing of polyurethanes prepared by this method. However, suitable catalysts may, of course, be used in special cases for the purpose of shortening the reaction time. Suitable catalysts are particularly iron (III) compounds, e.g. iron (III) chloride, iron acetylacetonate, iron pentacarbonyl, iron ethyl acetate or iron cyclopentanone carboxylic acid esters or compounds of the metals nickel, cobalt, zinc, lead, aluminium, manganese or magnesium having the same or a similar structure. Basic catalysts such as tertiary amines are not generally suitable because they favor isocyanate side reactions.

Owing to the marked influence of temperature on the polyurethane reaction (Examples 9 and 10) it is very important that the specific reaction temperature should be reached practically instantaneously without long heating and should be very accurately maintained, preferably with a maximum variation of ±1° over the whole reaction period while the reaction mixture is constantly and thoroughly stirred. The solution of the diol or diol mixture is preferably introduced at the reaction temperature into a temperature regulated reactor and the diisocyanate is added from a dosing pump and the reactants thoroughly mixed at the same time; the time taken for adding the isocyanate should not be more than 10% and preferably not more than 5% of the reaction time. The progress of the chain building reaction can easily be followed by continuously measuring the viscosity and the reaction is completed as soon as there is no further increase in the viscosity of the reaction mixture. This occurs after 2 to 20 hours, depending on the diol-diisocyanate combination, but usually after 5 to 12 hours, the reaction mixture then generally still containing 0.02 to 0.07% of free isocyanate groups. Since partial thermal degradation (recognizable by a drop in the viscosity) takes place if the reaction mixture remains for too long at the reaction temperature, the reaction mixture is immediately cooled to 60–100° C., preferably 70–90° C. and in the subsequent "stabilizing phase" (b) it is subjected to a thermal aftertreatment at this temperature with vigorous mixing. At the end of the after-treatment which is carried out for 12 to 72 hours and preferably 12 to 24 hours, no more free isocyanate can be detected in the reaction mixture. If desired, polar solvents such as ethyl acetate, acetone, methyl ethyl ketone, etc. may be added during the "stabilizing phase." This may sometimes be advantageous, especially if the reaction mixtures are highly viscous.

In the commercial application of the product, the resulting solution of high molecular weight polyurethane which is free from isocyanate groups and still contains hydroxyl end groups, which solution preferably has a concentration of 40 to 50% by weight, or the mixture of polyurethane and solvent, may be adjusted to the desired solids content and/or viscosity by the addition of conventional, mainly polar solvents such as trichloroethylene, acetone, ethyl acetate, methyl ethyl ketone or methyl glycol acetate. However, contrary to what has been stated in U.S. Patent Specification No. 3,223,672, solutions which contain toluene are frequently found to have an unstable viscosity. Owing to a tendency to gel which is due to the presence of toluene, prolonged storage frequently results in a marked increase in viscosity (Example 12), which is not very apparent at the low viscosities used in U.S. Patent Specification No. 3,223,672. On the other hand, the solid polyurethane products obtained when the toluene required as reaction medium has been removed after the "stabilizing phase" are distinguished by the exceptional constancy of their solution viscosity. It is therefore advantageous in principle first to obtain the solid polyurethane from the reaction mixture and then to dissolve it in the usual organic solvents or solvent mixtures according to various formulations.

The solid polyurethane is obtained in reaction stage (c), preferably using a vacuum evaporator screw in which the temperature increases stepwise along the length of the screw from 100° C. to 145° C. and a vacuum of 1 to 100 mm. Hg, preferably 20 to 30 mm. Hg, is maintained so that the solvent evaporates off, and is then returned to the reaction mixture after condensation and, if necessary, rectification. The speed of rotation of the screw and the rate of feed of product are adjusted relative to each other that the solid polyurethanes staying in the evaporation screw for 0.5 to 10 minutes is heated to 160–180° C. by the heat of friction. This brief thermoplastic after-treatment of the solid polyurethane in the evaporation screw surprisingly has the effect of improving the mechanical properties of cross-linked sheetings produced from these polyurethanes, especially their resistance to hydrolysis (Examples 13 and 14). If the solid material leaving the evaporation screw under conditions resembling extrusion is rapidly cooled and if the product is bead granulated and at the same time covered with wet talcum and then dried in a fluidized bed, a non-sticky polyurethane granulate composed of lenticular particles is obtained. All the steps of the process are preferably carried out continuously.

The process according to the invention provides for improved reproducibility of production on a commercial scale and produces chemically very uniform linear polyurethanes which are completely soluble in most organic solvents without gelling or swelling and which are very suitable for the production of high quality textile coatings on a two-component basis and for the production of polyurethane adhesives.

The examples which follow serve to explain more fully the process described above.

EXAMPLE 1

In a reactor designed for an excess pressure of 6 atmospheres, 105 parts by weight of a mixture of 65% 2,4- and 35% 2,6-tolylene diisocyanate are added to a solution of 500 parts by weight of a polyester of adipic acid and hexane-1,6-diol having the hydroxyl number 135.3 and acid number 0.8, in 605 parts by weight of toluene at room temperature, the proportions in which the reactants are added together corresponding to an NCO/OH ratio of 0.995. The reaction mixture is vigorously mixed for 10 minutes to homogenize it, then heated to the reaction temperature of 130° C. within 15 minutes and kept at this temperature with vigorous mixing and control of the viscosity. The viscosity has reached its maximum after 7 hours, with an NCO residue of 0.03%. The reaction mixture is cooled to 80° C. and kept at this temperature for 12 hours with continuous mixing. No free isocyanate can be detected at the end of this time. Toluene is removed in an evaporation screw at heating temperatures of between 100 and 145° C. and a vacuum of 30 mm. Hg. The solid polyurethane remaining for 4 minutes in the screw rotating at 50 revs./min. briefly becomes heated to 160° C. The polyurethane leaving the evaporation screw under conditions resembling extrusion is bead granulated while sprayed with cold talcum water and then dried in a fluidized bed. A granulate of lenticular particles is obtained, the 30% by weight solution of which in ethyl acetate has a viscosity of 56,000 cp. at 20° C. The solution viscosity does not change in the course of prolonged storage of the granulate. Using the scattered light method, the product is found to have an average molecular weight of 120,000.

EXAMPLE 2

Using the same conditions as in Example 1, 500 parts by weight of a polyester of adipic acid and hexane-1,6-diol (hydroxyl number 176.7, acid number 0.7) in 606.5 parts by weight of toluene are reacted with 106.5 parts by weight of tolylene diisocyanate mixture of Example 1, corresponding to an NCO/OH ratio of 1. The polyester contains 15 p.p.m. of iron acetylacetonate as catalyst. The viscosity maximum is reached after a reaction time of 5 hours at 130° C., with an NCO residue of 0.035%. The reaction mixture is then after-treated at 80° C. for 12 hours.

The solution, diluted to a solids content of 30% by weight with ethyl acetate has a viscosity of 198,000 cp. at 20° C. The viscosity of a 30% by weight solution in ethyl acetate of the solid obtained after evaporation of the tolene as described in Example 1 is 130,700 cp. at 20° C. It is found to have an average molecular weight of 220,000.

EXAMPLE 3

151 parts of melted diphenylmethane-4,4'-diisocyanate are added in the course of 30 minutes to a solution of 500 parts by weight of a polyester of adipic acid and hexane-1,6-diol (hydroxyl number 136.9, acid number 0.8) in 651 parts by weight of toluene, which solution has been preheated to 130° C., the amount of diphenylmethane-4, 4'-diisocyanate added corresponding to an NCO/OH ratio of 0.986. After a reaction time of 6 hours at 130° C., the viscosity ceases to rise and the residual NCO content is then 0.025%. After 12 hours after-treatment at 80° C., no more free isocyanate can be detected.

The viscosity of a 30% by weight solution in ethyl acetate of the solid obtained after evaporation of the toluene in an evaporation screw is 100, 500 cp. at 20° C., which corresponds to an average molecular weight of 190,000.

EXAMPLE 4

The experiment described in Example 3 is repeated using an NCO/OH ratio of 0.984 but otherwise the same conditions. After evaporation of the toluene as described in Example 1, a solid is obtained whose 30% by weight solution in ethyl acetate has a viscosity of 60,300 cp. at 20° C. which corresponds to an average molecular weight of 130,000.

EXAMPLE 5

250 parts by weight of a polyester of adipic acid and diethylene glycol (hydroxyl number 45.0, acid number 0.9) and 250 parts by weight of a polyester of adipic acid and ethylene glycol (hydroxyl number 54.7, acid number 0.9) are dissolved in 540 parts by weight of toluene and heated to 140° C. (1.2 excess atmospheres). 39.5 parts by weight of a mixture of 65% 2,4- and 35% 2,6-tolylene diisocyanate, corresponding to an NCO/OH ratio of 1, are added in the course of 15 minutes while the reaction mixture is vigorously mixed, and the temperature is maintained at 140° C. for 17 hours, after which no further rise in viscosity is recorded (0.045% NCO residue). The reaction mixture is free from isocyanate after an after-treatment at 80° C. for 36 hours.

After removal of the toluene in an evaporation screw as described in Example 1, the viscosity of a 30% solution of the resulting solid in ethyl acetate is 61,500 cp. at 20° C., corresponding to an average molecular weight of 131,000.

EXAMPLE 6

500 parts by weight of a polyester of adipic acid and ethylene glycol (hydroxyl number 57.1, acid number 0.9) are preheated to 140° C. in 635 parts by weight of toluene, 45.0 parts by weight of a mixture of 65% 2,4- and 35% 2,6-tolylene diisocyanate, corresponding to an NCO/OH ratio of 1, are introduced with a dosing pump with vigorous mixing and the reaction mixture is maintained at 140° C. with constant mixing for 18 hours until the maximum viscosity is reached. The reaction mixture, which then still contains 0.05% of NCO, is after-treated at 80° C. for 48 hours until it is free from NCO. The viscosity of a 30% by weight solution in ethyl acetate of the solid obtained after evaporation of toluene is 91,700 cp. at 20° C., and the viscosity of the 15% by weight solution in methyl ethyl ketone at 20° C. is 520 cp. The average molecular weight is found to be 164,000.

EXAMPLE 7

41.4 parts by weight of a mixture of 65% 2,4- and 35% 2,6-tolylene diisocyanate are added to a solution of 500 parts by weight of a polyester of adipic acid and butane-1,4-diol (hydroxyl number 52.3, acid number 0.8) in 815 parts by weight of toluene in the course of 15 minutes at 115° C. with vigorous stirring, the amount of tolylene diisocyanates added corresponding to an NCO/OH ratio of 1, the reaction is left to continue at 115° C. for 17 hours with continuous stirring of the reaction mixture, and the reaction mixture is then left at 80° C. for 24 hours. No more free isocyanate can be detected at the end of this time. After dilution with ethyl acetate to a solids content of 30% by weight, the reaction mixture has a viscosity of 333,500 cp. at 20° C. A 15% by weight solution in methyl ethyl ketone of the solid obtained in a manner analogous to Example 1 after evaporation of toluene has a viscosity of 1510 cp. at 20° C. The average molecular weight is 270,000.

EXAMPLE 8

500 parts by weight of a polyester of adipic acid and butane-1,4-diol (hydroxyl number 50.2, acid number 0.8) and 8.0 parts by weight of butane-1,4-diol are dissolved in 882 parts by weight of toluene, and 79.04 parts by weight of melted diphenylmethane-4,4'-diisocyanate, corresponding to an NCO/OH ratio of 0.998, are added with vigorous stirring at 120° C. in the course of 20 minutes. After 12 hours of reaction carried out at 120° C. with constant stirring, no further increase in viscosity can be observed. The reaction mixture is then after-treated at 80° C. for 18 hours until it is free from isocyanate. The 15% solution in methyl ethyl ketone of the solid obtained after evaporation of toluene has a viscosity of 1460 cp. at 20° C., which corresponds to an average molecular weight of 245,000.

EXAMPLE 9

Using four parallel reaction mixtures, 500 parts by weight of a polyester of adipic acid and hexane-1,6-diol (hydroxyl number 135.4, acid number 0.7) are dissolved in 900 parts by weight of toluene in each case, 105 parts by weight of a mixture of 65% 2,4- and 35% 2,6-tolylene diisocyanate, corresponding to an NCO/OH ratio of 0.995, are added at the reaction temperature and the reaction is carried out with continuous mixing at (a) 100° C., (b) 115° C., (c) 130° C. and (d) 145° C. until maximum viscosity is reached. The reaction mixtures are then in each case after treated at 80° C., and the viscosities obtained by diluting the after-treated reaction mixtures to a solids content of 30% by weight with ethyl acetate show the influence of temperature on the course of the reaction as indicated below:

| | Reaction temperature, °C. | Reaction time, hours | Residual NCO, percent | After-treatment at 80° C. until all NCO removed, hours | Viscosity of solution adjusted to 30% solids content with ethyl acetate, cp. (20°C) |
|---|---|---|---|---|---|
| (a) | 100 | 11 | 0.035 | 12 | 4,840 |
| (b) | 115 | 9 | 0.038 | 12 | 8,760 |
| (c) | 130 | 8 | 0.031 | 12 | 38,100 |
| (d) | 145 | 7 | 0.034 | 12 | 19,950 |

EXAMPLE 10

Four parallel reaction mixtures are prepared in a manner analogous to Example 9 by dissolving 500 parts by weight of a polyester of adipic acid and butane-1,4-diol (hydroxyl number 52.3, acid number 0.8) in 815 parts by weight of toluene in each case, mixing this with 4.1 parts by weight of a mixture of 65% 2,4- and 35% 2,6-tolylene diisocyanate (corresponding to an NCO/OH ratio of 1) at the reaction temperature and then reacting the mixture at (a) 100° C., (b) 115° C., (c) 130° C. and (d) 145° C. and then after-treating it at 80° C. The viscosities of a 15% by weight solution in methyl ethyl ketone of the solids obtained after evaporation of toluene again show the clear dependence of the reaction on the temperature.

| | Reaction temperature, °C. | Reaction time, hours | Residual NCO, percent | After-treatment at 80° C. until free from NCO, hours | Viscosity of the solid as a 15% solution in methyl ethyl ketone, cp. (20° C.) |
|---|---|---|---|---|---|
| (a) | 100 | 20 | 0.037 | 24 | 775 |
| (b) | 115 | 17 | 0.045 | 24 | 1510 |
| (c) | 130 | 15 | 0.046 | 24 | 755 |
| (d) | 145 | 12 | 0.053 | 24 | 65 |

EXAMPLE 11

Four parallel reaction mixtures are prepared by dissolving 500 parts by weight of a polyester of adipic acid and hexane-1,6-diol (hydroxyl number 134.8, acid number 0.9) in 605 parts by weight of (a) toluene, (b) dioxane, (c) cyclohexane and (d) diisopropylether and adding 105.2 parts by weight of a mixture of 65% 2,4- and 35% 2,6-tolylene diisocyanate, corresponding to an NCO/OH ratio of 1, at room temperature, and the reaction mixtures are then heated up to 130° C. within 15 minutes and the reacted at 130° C. for 12 hours with constant stirring. All the reaction mixtures are then after-treated at 80° C. fo 24 hous. The viscosities of a 30% by weight solution in ethyl acetate of the solids obtained after removal of the solvent and the average molecular weights determined by the scattered light method clearly show the influence of the polarity of the solvent on the reaction, as indicated below:

| | Reaction medium | Viscosity of a 30% solution of solid in ethyl acetate, cp. (20° C.) | Average molecular weight | Polarity of the solvent at 25° C. in Kcal./mol |
|---|---|---|---|---|
| (a) | Toluene | 104,000 | 144,000 | 33.9 |
| (b) | Dioxane | 2,500 | +12,000 | 36.0 |
| (c) | Cyclohexane | 119,000 | 174,000 | 31.2 |
| (d) | Diisopropyl ether | 35,400 | 91,000 | 34.0 |

EXAMPLE 12

Employing the reaction conditions described in Example 8, 400 parts by weight of a polyester of adipic acid and butane-1,4-diol (hydroxyl number 51.5, acid number 0.7) and 8.0 parts by weight of butane-1,4-diol are reacted with 79.05 parts by weight of diphenylmethane-4,4'-diisocyanate (corresponding to an NCO/OH ratio of 0.985) in 882 parts by weight of toluene at 120° C. When the maximum viscosity has been reached, the reaction mixture is halved. The first half is not given any thermal after-treatment. Part of it is diluted to a solids content of 15% with methyl ethyl ketone (I, 1) and another part is freed from toluene in a 4-shaft evaporation screw (I, 2). The second half is after-treated at 80° C. for 25 hours and then, in the same way as the first half, part of it is diluted to a solids content of 15% with methyl ethyl ketone (II, 1) and the other part is freed from toluene (II, 2). A comparison of the solution viscosities clearly shows the stabilizing effect of the thermal after-treatment on the solid polyurethane (II, 2) while the solutions which contain toluene (I, 1 and II, 1) in contrast to what has been stated in U.S. Pat. No. 3,223,672, undergo a marked increase in viscosity during storage, as indicated below.

| | 15% solution in MEK of product containing toluene | |
|---|---|---|
| Viscosity | I, 1 (untreated) | II, 1 (aftertreated at 80° C.) |
| Immediately | 1,335 cp. (20° C.) | 2,090 cp. (20° C.). |
| After 10 days | 2,420 cp. (20° C.) | 3,515 cp. (20° C.). |

| | 15% solution of the solid in MEK | |
|---|---|---|
| | I, 2 (untreated) | II, 2 (aftertreated at 80° C.) |
| Immediately | 855 cp. (20° C.) | 1,110 cp. (20° C.). |
| After 10 days | 1,815 cp. (20° C.) | 1,610 cp. (20° C.). |

EXAMPLE 13

5% by weight of a 75% solution in ethyl acetate of a triisocyanate prepared from trimethylolpropane and a mixture of 65% 2,4- and 35% 2,6-tolylene diisocyanate is added as cross-linking agent to a solution of polyurethane in toluene prepared as described in Example 2 (viscosity 198,000 cp.$_{20}$) which has been diluted to a solids content of 30% by weight with ethyl acetate. The reaction mixture is vigorously stirred and then poured out on to a glass plate. After evaporation of the solvent, a film which is insoluble in organic solvents and which has the following mechanical properties is obtained:

Hardness Shore A _____ 73
Tensile strength (kg./cm.$^2$) elongation at break:
Unaged _____ 295/500
110h Fade-Ometer _____ 74/400
12 days 70° C., 95% relative humidity __ 160/700

EXAMPLE 14

The polyurethane solution prepared in Example 2 is freed from toluene in an evaporation screw under a vacuum of 30 mm. Hg at an operating temperature which increases stepwise from 100° C. to 145° C. over the length of the screw to obtain the solid polyurethane resin which leaves the screw under conditions resembling extrusion after staying there for an average length of time of 5 minutes and being heated in it to 170° C.

A 30% by weight solution in ethyl acetate of solid polyurethane obtained in this way (viscosity of the solution: 130,700 cp.$_{20}$) is mixed with 5% by weight of a 75% solution of a triisocyanate prepared from trimethylolpropane and tolylene diisocyanate as in Example 13 and poured out on a glass plate. After evaporation of the solvent, a cross-linked film which is insoluble in organic solvents is obtained in which the mechanical properties are distinctly improved compared with those in Example 14.

Hardness Shore A _____ 75
Tensile strength (kg./cm.$^2$) elongation at break:
Unaged _____ 315/520
110h Fade-Ometer _____ 100/400
12 days, 70° C., 95% relative humidity __ 260/715

It is to be understood that any of the components and conditions mentioned as suitable herein can be substituted for its counterpart in the foregoing examples and that although the invention has been described in considerable detail in the foregoing, such detail is solely for the purpose of llustration. Variations can be made in the inventon by those skilled in the art without departing from the spirit and scope of the invention except as is set forth in the claims.

What is claimed is:

1. A process for the preparation of high molecular weight polyurethanes which are soluble in organic solvents and which contain free hydroxyl groups which comprises reacting an organic dihydroxy compound having an average molecular weight of 500 to 5000 with an organic diisocyanate at an NCO/OH ratio up to and including 1, in three stages:
(a) said dihydroxy compound and said diisocyanate are mixed and then reacted at a specific reaction temperature between 100° C. and 160° C., in the presence of 30 to 80 parts by weight of non-polar or slightly polar solvents, such that the sum of the quantity of solvent used, the quantity of dihydroxy compound and the quantity of diisocyanate is 100 parts by weight, the reaction being carried out with constant control of the viscosity until the maximum viscosity is reached,
(b) then heating the reaction mixture in a second reaction stage at 60 to 100° C. for 12 to 72 hours until no more free isocyanate can be detected, and
(c) removing the solvent in a third reaction stage at reduced pressure and at elevated temperature above 100° C.

2. The process of Claim 1 wherein said dihydroxy compound is a hydroxyl polyester.

3. The process of Claim 1 wherein stage (a) reaction temperature is in the range of about 115° C. to about 140° C. and stage (b) is in the range of about 70° C. to about 90° C.

4. The process of Claim 1 wherein the solvent is present in an amount of about 50 to 60 parts by weight.

5. The process of Claim 1 wherein the solvent is removed using an evaporation screw at a vacuum of 1 to 100 mm. Hg, the heating temperature rising stepwise from 100° C. to 145° C. over the length of the screw, and the speed of rotation of the screw and rate of feed of product through the screw being so adjusted that the solid polyurethane remaining in the screw for 0.5 to 10 minutes is briefly heated to 160° C.–180° C. by the heat of friction which effects a specific after-treatment which improves its mechanical properties.

6. Process according to Claim 5 wherein the solvent is toluene.

7. Process according to Claim 5 wherein the solid polyurethane leaving the evaporation screw under conditions resembling extrusion is granulated while being treated with wet talcum and is then dried in a fluidized bed.

8. Process according to Claim 1 wherein the evaporated solvent is condensed and returned to the reaction mixture.

9. The product of the process of claim 1.

10. The process of Claim 1 wherein all reaction stages are performed continuously.

11. The process of claim 1 wherein the solvent is toluene, xylene, cyclohexane, benzene, diisopropylether, di-n-butylether, carbon disulphide, carbon tetrachloride or n-hexane.

References Cited
UNITED STATES PATENTS 3,620,680 11/1971 Bartel et al. _____ 260—75 NE X
3,635,871 1/1972 Kawaquchi et al. 260—77.5 AA X
3,639,652 2/1972 Mommaerts et al. 260—75 NE X
3,642,964 2/1972 Rausch et al. ____ 260—75 TN X HERBERT S. COCKERAM, Primary Examiner U.S. Cl. X.R.

260—75 NB, 77.5 AA